United States Patent [19]
Lizée et al.

[11] Patent Number: 5,671,404
[45] Date of Patent: Sep. 23, 1997

[54] SYSTEM FOR QUERYING DATABASES AUTOMATICALLY

[75] Inventors: Martin Lizée, 5383 Gatineau, Montreal, P.Q., Canada, H3T 1X2; Robert Lizée, 362 Palmerston Blvd., Toronto, Ontario, Canada, M6G 2N6

[73] Assignees: Martin Lizee, Montreal; Robert Lizee, Toronto, both of Canada

[21] Appl. No.: 413,630

[22] Filed: Mar. 30, 1995

[30] Foreign Application Priority Data

Mar. 31, 1994 [CA] Canada ................................. 2120447

[51] Int. Cl.$^6$ ................................................. G06F 17/30
[52] U.S. Cl. ..................... 395/605; 395/603; 395/604; 395/606
[58] Field of Search .............................. 395/600, 602, 395/603, 604, 605, 606

[56] References Cited

U.S. PATENT DOCUMENTS

| | | | |
|---|---|---|---|
| 4,554,631 | 11/1985 | Reddington | 364/300 |
| 4,799,254 | 1/1989 | Dayton et al. | 379/97 |
| 4,820,568 | 4/1989 | Kahle et al. | 364/200 |
| 4,823,306 | 4/1989 | Barbic et al. | 364/900 |
| 5,020,019 | 5/1991 | Ogawa | 364/900 |
| 5,062,074 | 10/1991 | Kleinberger | 364/900 |
| 5,161,223 | 11/1992 | Abraham | 395/600 |
| 5,201,048 | 4/1993 | Coulter et al. | 395/600 |
| 5,263,159 | 11/1993 | Mitsuui | 395/605 |
| 5,276,732 | 1/1994 | Stent et al. | 379/93 |
| 5,278,980 | 1/1994 | Pedersen et al. | 395/600 |
| 5,321,833 | 6/1994 | Chang et al. | 395/600 |
| 5,337,347 | 8/1994 | Halstead-Nusslock et al. | 379/67 |
| 5,404,514 | 4/1995 | Kageneck et al. | 395/600 |

OTHER PUBLICATIONS

Korth and Silberschatz, "Database System Concepts" 2d, McGraw–Hill Computer Science Series, pp. 53, 97–98 1991.

*Primary Examiner*—Thomas G. Black
*Assistant Examiner*—Donald D. Min

[57] ABSTRACT

A data processing system is disclosed to automatically query databases. The invention provides an Automatically Relaxable Query (ARQ) which includes a list of query conditions ordered in descending degree of importance. First, the database is queried on the first condition of the ARQ; if any object is found, the system labels this first condition. Then, the system proceeds with a query composed of all the conditions labelled previously in conjunction with the next condition of the ARQ; if any object is found then this next condition is labelled. And so on, in order, for all the remaining conditions of the ARQ until a predetermined termination condition is achieved. Finally, the system reports which conditions were labelled, and if the query composed of the labelled conditions matches only few objects of the database, they are automatically retrieved. The automatic querying with an ARQ enables faster searches, minimizes interaction between database and user and permits offline preparation of the search.

19 Claims, 4 Drawing Sheets

EXAMPLE OF THE EXECUTION OF AN
AUTOMATICALLY RELAXABLE QUERY (ARQ)

```
C1
C2
C3
C4
C5
```
QUERY: C1 → RESULT: 150 OBJECTS, KEEP C1

```
>C1<
C2
C3
C4
C5
```
QUERY: C1 & C2 → RESULT: 0 OBJECTS, DROP C2

```
>C1<
~~C2~~
C3
C4
C5
```
QUERY: C1 & C3 → RESULT: 50 OBJECTS, KEEP C3

```
>C1<
~~C2~~
>C3<
C4
C5
```
QUERY: C1 & C3 & C4 → RESULT: 11 OBJECTS, KEEP C4

```
>C1<
~~C2~~
>C3<
>C4<
C5
```
QUERY: C1 & C3 & C4 & C5 → RESULT: 0 OBJECTS, DROP C5

---

```
>C1<
~~C2~~
>C3<
>C4<
~~C5~~
```
THE FINAL QUERY COMPRISES CONDITIONS C1 & C3 & C4
RESULTING IN 11 FOUND OBJECTS.

FIG. 2

SYSTEM FOR QUERYING DATABASES AUTOMATICALLY

FIELD OF THE INVENTION

The invention disclosed herein relates to the field of information retrieval, and particularly to the improved performance of information retrieval through the use of automatic query processing. The invention may be used in any setting where information retrieval is desired. Such applications include, but are not limited exclusively to, text databases, relational databases, and off-line querying of databases.

BACKGROUND OF THE INVENTION

Generally, information retrieval involves the search of retrieval objects in database systems through the use of information retrieval queries. This is normally followed by the outputting of the retrieval objects found. Records and documents are typical retrieval objects.

In the past, a major issue in information retrieval is how to query database systems effectively to find the desired retrieval objects. In the past, a the most common method has been for the user to perform queries interactively until the desired retrieval objects are found. The main problem is that this method requires a continuous interaction between the user and the database system by trial and error in order to search for the desired retrieval objects.

Accordingly, during an interactive query, a user constantly evaluates the results of the query and must adjust and re-query the database until the desired retrieval objects are found. Although this method may ultimately give excellent results, the process of querying is time consuming, expensive and repetitive.

Furthermore, a database system containing a large quantity of retrieval objects is more complex to search because a larger number of retrieval objects are more likely to share common characteristics. In this situation, a user must be more specific when querying the database system, increasing the number of query limitations in order to find the desired retrieval objects, as the size of the database may review a number of retrieval objects too large to be useful. This is true for large relational databases system and is especially true for text databases system wherein most of the words are indexed.

Most text databases system are also complex to query because they are not well-structured and the user cannot rely on the structure of the database to query it.

Some databases system have a thesaurus listing expressions with a similar meaning which may facilitate the query process. Such aids are helpful in finding the desired retrieval objects, but a continuous interaction between the user and the database system is still needed.

Another difficulty that database users have to overcome is to design effective queries to find the desired retrieval objects. Most query languages require a good knowledge of boolean logic and of the database by the user.

An attempt to overcome the drawbacks of interactive querying by using a quantitative retrieval method, is given in U.S. Pat. No. 5,263,159 issued on Nov. 16, 1993. In the method of this patent, the user asks the database to find the documents that best match the conditions of the query without necessarily matching all these conditions. Each condition of the query has a weight and the score for a retrieval object of the database consist of the sum of the weights of all the conditions satisfied by the retrieval object. Only then are the documents with the best scores kept.

Furthermore, quantitative retrieval is still inconvenient in that the user must select a weight for each condition, which might not be obvious to establish. As well, the search results of a quantitative retrieval search do not provide sufficient confidence to the user that all useful retrieval objects have been found because the evolution of the search process is not transparent to the user resulting in a level of uncertainty as to whether each condition has been searched.

Finally, quantitative retrieval can be a long process since for a number of N conditions in a quantitative retrieval query, up to $2^N$ queries might be needed to find the desired retrieval objects.

In practice, a user searching interactively in a database system adds conditions to a query in order to pin-point a set of relevant retrieval objects. The decision to add a new query condition often depends only on the number of retrieval objects found rather than the contents of the retrieval object found—a large number of findings may necessitate further conditions.

Accordingly, there has been a need for a method of querying databases automatically which provides the user the ability to make an off-line determination of query parameters in order to minimize any on-line connection time and charges. Furthermore, there has been a need for a method which provides for greater speed for querying where the search is linear with respect to the conditions set.

SUMMARY OF THE INVENTION

The present invention overcomes the problems described above by establishing a query system of an ordered list of all possible conditions for the search, ordered from the most important to the least important which forms the Automatically Relaxable Query (ARQ).

The invention provides a method to automate the query process so that after defining an ARQ and launching it, the user merely waits for the results. The ARQ will query automatically the database system, relaxing the ARQ if needed, to find the desired retrieval objects. An advantage of this query system is that it is less likely for human mistakes to occur since the user has only to define an ARQ and doesn't have to directly query the database. It gives also the possibility to do off-line search in the case of a remote database system. The user can therefore define ARQs without being connected to the database system, and when connected to it, no user intervention is needed since the ARQ will automatically do the search. In this case the communication with the database system is optimized since there is no 'dead time', in the sense that there are no moments where a user needs to think about the search while being connected.

A further advantage of the present query process is greater speed since the number of queries that the process will have to do when querying the database with the ARQ is linear with the number of conditions defining the ARQ. The querying processing speed is improved since machine/machine interaction is faster than a machine/human interaction.

The present query system saves communication time, and all the costs that can be related to it because the query process is faster and more optimized, enabling even a user to find desired retrieval objects with only a few ARQ. It also enables databases to accommodate more users with the same resources since the connections are optimized, and users are more satisfy with the result of their search and the cost related to it.

The present invention can be use on any database system without modification to it if desired. It is also possible to adapt an ARQ to work on different databases system in order for the user to have the search done in different databases system without redefining other queries.

An aspect of the invention is the deterministic nature of the querying process whereby the conditions of the ARQ are not marked if and only if any subset of conditions that contains it together with the marked conditions of higher rank in the ARQ satisfies no retrieval objects. Knowing this, a user can understand easily why a condition was not marked.

According to the present invention it is proposed to present the results of the ARQ search in a simple and intuitive way just by informing the user of the marked conditions of the ARQ, and by showing the resulting retrieval objects of each query condition.

In accordance with the invention, a method for retrieving information from a database through a computer in communication with the database is provided, the database having retrieval objects, the computer defining a plurality of ordered and distinct query conditions, comprising the steps of:

a) testing a query condition within the database to determine the number of database retrieval objects which satisfy the query condition;

b) marking said query condition if at least one database retrieval object satisfies the query condition;

c) repeating steps a) and b) with each ordered and distinct query condition in combination with all previously marked query conditions until a predetermined termination condition is satisfied.

In an alternate embodiment of the invention, step c) further comprises i) reporting the number of database retrieval objects which satisfy the query condition for each query condition; and, ii) identifying said retrieval objects to the computer Another embodiment of the inventing provides that the pre-determined termination condition requires that all query conditions have been tested.

A still further embodiment provides that the pre-determined termination condition requires that all query conditions have been tested or a pre-set minimum number of database retrieval objects which satisfy the query condition is determined.

Other embodiments provide a method wherein the database system is a relational database system, the query condition is a structured query language (SQL) statement, the database system is a full text database system and the retrieval objects are documents, the query condition is a word or word group and the testing of step a) is satisfied if a database document includes said word or word group, the computer is remote to the database and is connected to the database prior to the initiation of step a) and disconnected from the database after said termination condition is achieved.

In a specific embodiment of the invention, the invention provides an automatic information retrieval system for use with a computer having a link to a database system containing a plurality of retrieval objects, each retrieval object satisfying one or more query conditions, a query inputting device for specifying a query expressed as a conjunction of query conditions, the information retrieval system comprising:

(a) means for inputting a list of at least two query conditions ordered from the most important query condition to the least important query condition wherein each query condition of the list can be marked and starts as being unmarked;

(b) means for designating as the current query condition the most important query condition of said list of query conditions;

(c) means for querying said database system for retrieval objects, using said query inputting device, with a query composed of said current query condition;

(d) means for marking said current query condition if retrieval objects are found in (c);

(e) means for designating as current query condition the next less important query condition in said list;

(f) means for querying said database system for retrieval objects, using said query inputting device, with a query composed of the conjunction of all previously marked query conditions and said current query condition;

(g) means for marking said current query condition if retrieval objects are found in (f);

(h) means for repeating (e), (f) and (g) until all query conditions of said list have been designated once as current query condition.

In a still further embodiment of the invention, an automatic information retrieval method for use with a computer having a link to a database system containing a plurality of retrieval objects is provided, each retrieval object satisfying one or more query conditions, a query inputting device for specifying a query expressed as a conjunction of query conditions, the information retrieval method comprising the steps of:

(a) inputting a list of at least two query conditions ordered from the most important query condition to the least important query condition wherein each query condition of the list can be marked and starts as being unmarked;

(b) designating as the current query condition the most important query condition of said list of query conditions;

(c) querying said database system for retrieval objects, using said query inputting device, with a query composed of said current query condition;

(d) marking said current query condition if retrieval objects are found in step (c);

(e) designating as current query condition the next less important query condition in said list;

(f) querying said database system for retrieval objects, using said query inputting device, with a query composed of the conjunction of all previously marked query conditions and said current query condition;

(g) marking said current query condition if retrieval objects are found in step (f);

(h) repeating steps (e), (f) and (g) until all query conditions of said list have been designated once as current query condition.

BRIEF DESCRIPTION OF THE DRAWINGS

These and other features of the invention will be more apparent from the following description in which reference is made to the appended drawings wherein:

FIG. 2 is an example of the execution of an ARQ.

DETAILED DESCRIPTION OF THE INVENTION

A database system contains a plurality of retrieval objects. The databases system contains a query inputting device which enables to perform query to search for desired retrieval objects. The object of the query inputting device is to input queries and return the result of those queries by returning the number of retrieval objects found and/or the objects found.

Figure 3:
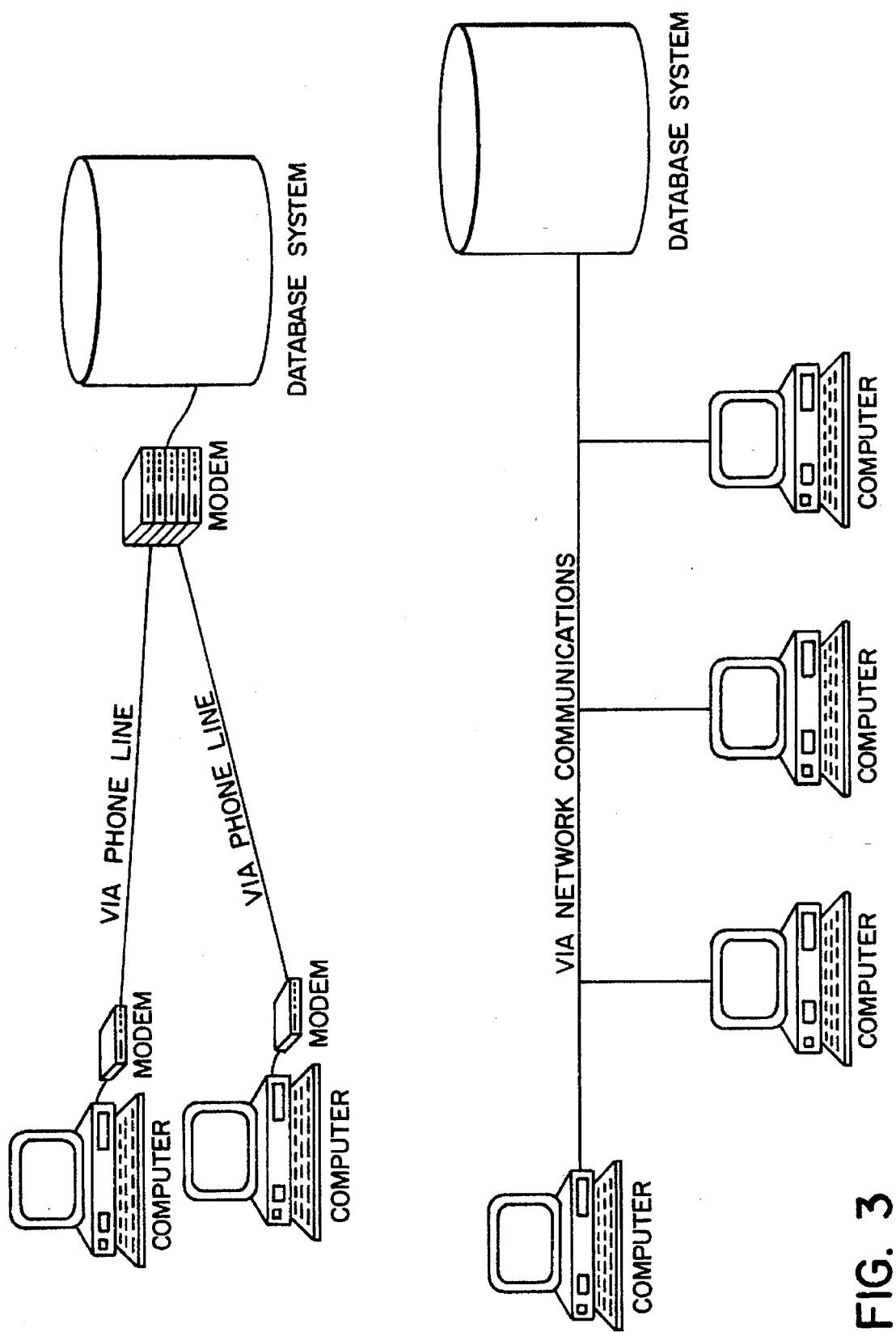
FIG. 3 is an illustration showing some possible communication links between a computer and a remote database.

In the present invention, the database system doesn't have to be local to the computer, but if it's a remote one, there must be a possible link between the computer and the database system. As shown in FIG. 3, this link can be through modem via phone line, through local area networks or through any other means possible.

A query condition as herein defined is any boolean condition which is used for querying objects. If a retrieval object respects a query condition, it responds positively to it, returning true, otherwise it responds negatively. A query condition can be composed of other conditions that are equivalent, for example "A or B" is considered here as only one query condition while "A or B and C" would be considered as query condition "A or B" and query condition "C". A query condition is any boolean condition that tends to narrow a search, thus "A or B" is considered as one condition.

A query is defined here as a conjunction of query conditions. The query searches for common retrieval objects responding positively to all its query conditions.

In the case of a full text database system, retrieval objects would correspond to documents, a query condition is the presence of a specific word or its equivalent word expression in a document and a query is a list of desired words with their equivalents. Here we say equivalent instead of synonymous because, depending on the context of the search, a user might consider two words that are not synonymous as being equivalent, for instance "divorce" might be equivalent to "separation". A word here can also be an expression like "family law".

In the case of a relational database system, retrieval objects would, correspond to records, a query condition would correspond to an SQL structured query language) condition and a query to an SQL statement made of its SQL conditions linked with the SQL operator "AND".

Figure 1A:
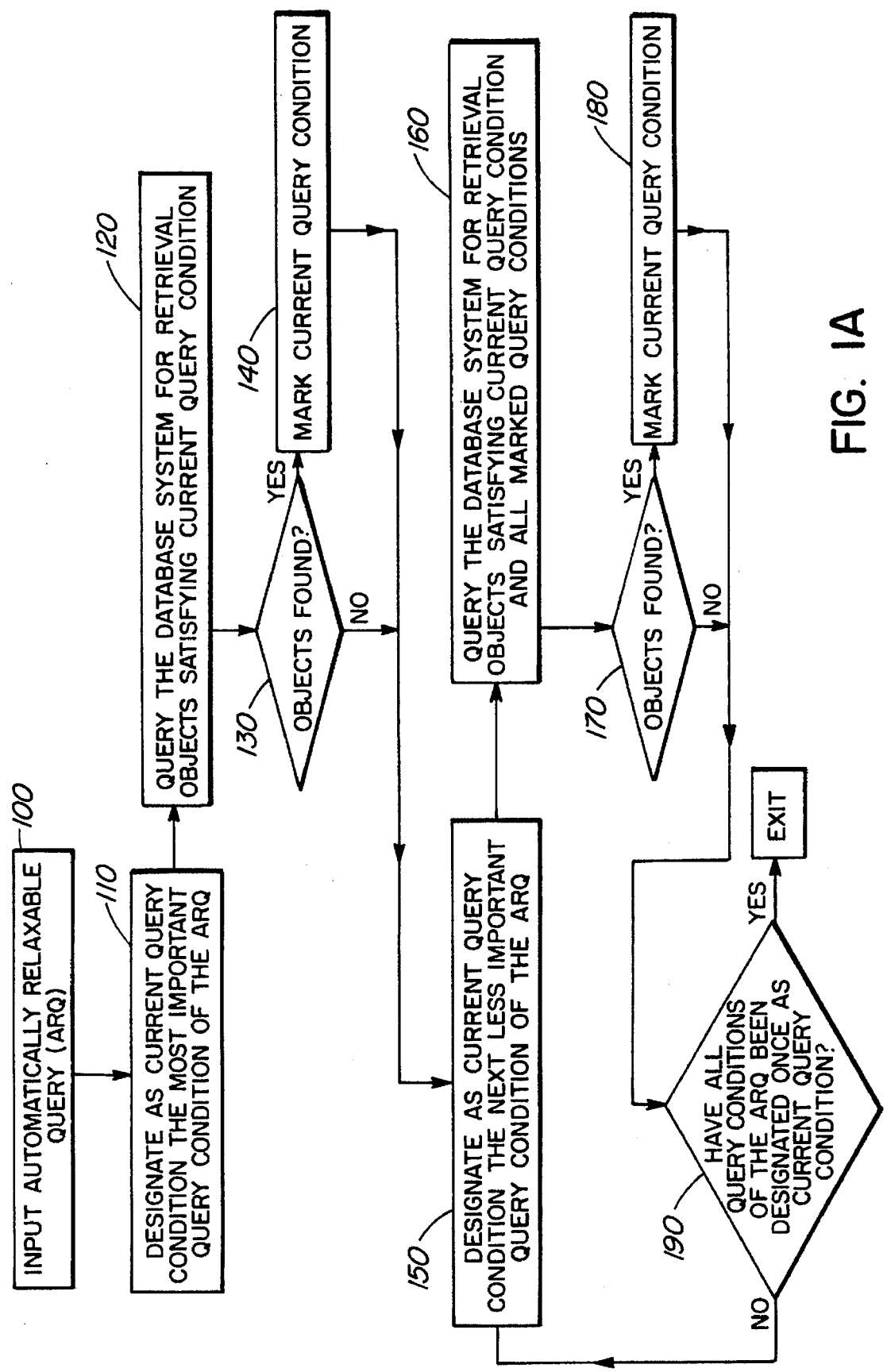
FIG. 1A is a flowchart showing the base process of an ARQ.
Figure 1B:
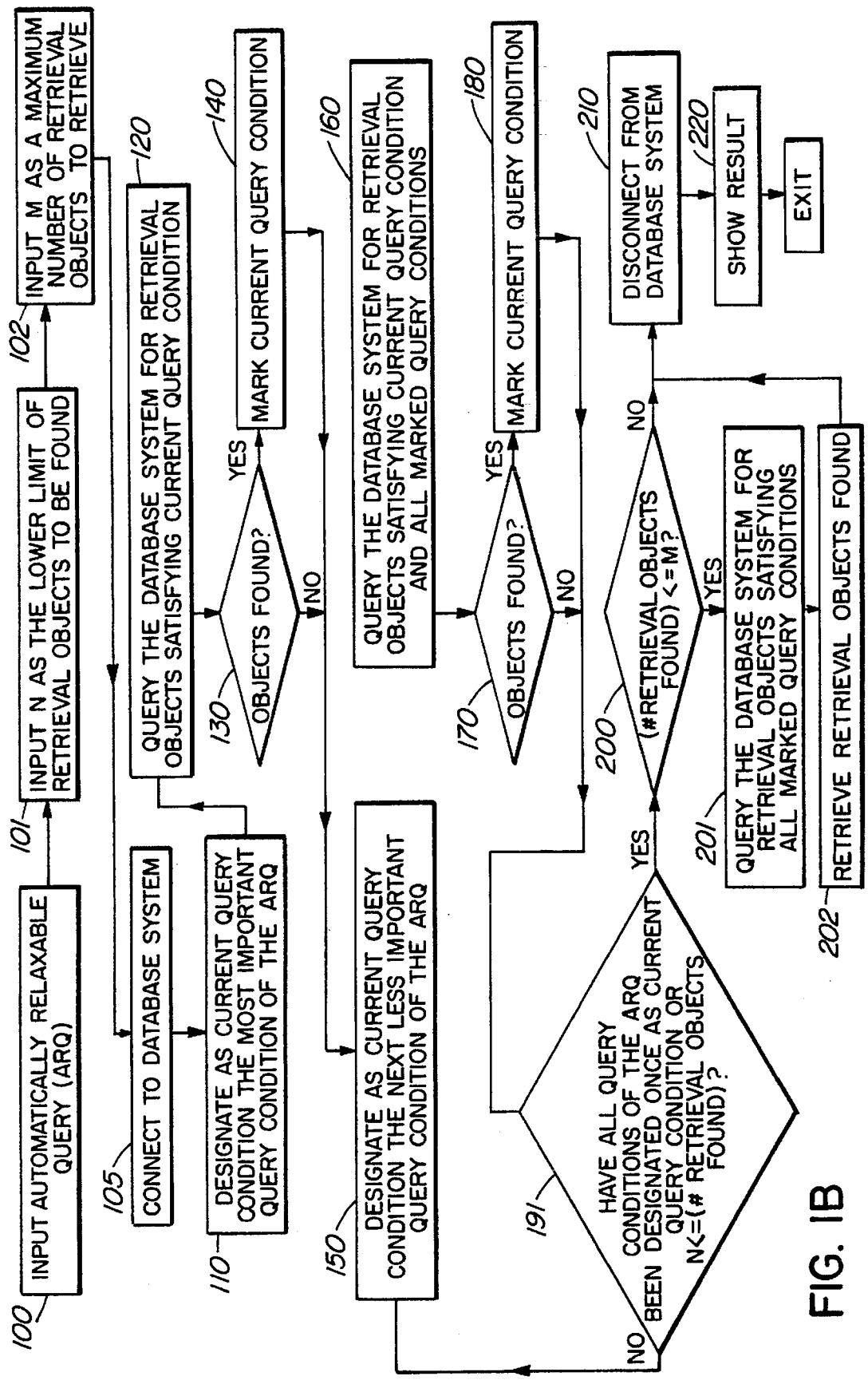
FIG. 1B is a flowchart showing the extended process of an ARQ.

FIG. 1A is a flow chart illustrating the logical operations of the method of the invention. FIG. 1B shows an alternate embodiments of the invention.

1. Input an Automatically Relaxable Query (box 100)

The method requires an input of a list of conditions ordered from the most important query condition to the least important query condition. This list is called the Automatically Relaxable Query (ARQ). The user chooses the relative importance of a query condition. The user chooses the most relevant query condition as being the most important and so on. An ARQ must have at least two query conditions, otherwise it would be a simple usual query. The ARQ is not necessarily input directly from the user, for instance, it can also be input from a file containing the composition of an ARQ.

Each query condition of the ARQ can be marked or unmarked. All query conditions start as being unmarked.

2. Connection to the database (box 105)

The computer must connect to the database system through the communication link. This step applies if the database system is remote as shown in FIG. 3. The connection includes whatever is necessary to get to the mode which makes querying of the database system possible.

3. Automatically querying database system with ARQ (boxes 120 to 190 included)

The computer queries the database system automatically with the ARQ. To do so, the computer must first query the database for retrieval objects that respond positively to the first query condition of the ARQ (boxes 110, 120, 130). If at least one retrieval object is found, the computer marks the first query condition (140). If no objects are found, the computer leaves the first query condition unmarked. The computer then queries the database system for retrieval objects that respond positively to the second query condition (box 150) and all of the previously marked query conditions (box 160). If at least one retrieval object is found (box 170), the computer marks the second condition (box 180). If no objects are found, the computer leaves the second query condition unmarked. The computer repeats the same sequence with the remaining query conditions (boxes 150, 160, 170, 180, 190). A procedure doing that is described:

(a) Designate the first condition as the current query condition (box 110);

(b) Query the database for retrieval objects with a query composed of the current query condition (box 120);

(c) Mark the current query condition if retrieval objects are found in (b) (boxes 130 and 140);

(d) Designate as current condition the next less important query condition (box 150);

(e) Query the database system for retrieval objects with a query composed with the conjunction of all previously marked query conditions and the current query condition (box 160);

(f) Mark the current query condition if retrieval objects are found in (e) (boxes 170 and 180);

(g) Repeat steps (d), (e) and (f) until all query conditions of the ARQ have been designated once as current (box 190).

An example of the application of this procedure is presented in FIG. 2, wherein C1 represents the first condition of the ARQ, C2 the second, and so on, the queries are presented as a conjunction of those conditions represented with the symbol '&'.

It is also possible to terminate the querying when a predetermined number of retrieval objects is found. For instance, if N represents the lower limit of retrieval objects to be found (box 101), step (g) is modified to read:

(g) Repeat (d), (e) and (f) until all conditions from the ARQ have been designated, or that the number of retrieval objects found in (e) is less than or equal to N (box 191).

4. Retrieve retrieval objects, if necessary (boxes 200, 201 and 202)

In this step, the computer queries the database system for retrieval objects that satisfy all the selected query conditions of the ARQ by using a query composed of all these selected query conditions (box 201), and then retrieves the retrieval objects found (box 202). It is possible to retrieve only parts of the retrieval objects, for instance retrieving only the titles of the documents found in a text database system. This step might not be performed if no conditions were checked in the ARQ.

It is also possible to make this step conditional (box 200), querying and retrieving if the number of retrieval objects found is not greater than a previously chosen number of desired retrieval objects.

5. Disconnection from database (box 210)

This step is done only if a connection to the database system was necessary. It is also possible to process other specified ARQ before disconnecting. This step is important in order to make the communication as short as possible.

6. Show results (box 220)

In this step, which is optional, the computer generates a report of its search, writing the conditions of the ARQ, specifying those which were marked, identifying the record and the retrieval objects found.

7. Other

It is also possible to implement the method directly in the database server, the database system would then directly support ARQ and query automatically its own database, instead of having the computer to automatically query the system. A good use of this alternative would be in electronic mail, a user would simply have to mail an ARQ to a database system which would treat the ARQ and mail back the result to the user.

Another way of presenting the treatment of an ARQ is to see it as a systematic reduction of a set of retrieval objects, which could be an advantage since each time less retrieval objects need to be tested. The treatment of an ARQ would then be:

(a) designate the first condition as the current query condition;

(b) find the retrieval objects responding positively to current query condition in the set of retrieval objects;

(c) reduce the set of retrieval objects to only those that are found in step (b) if some retrieval objects are found in step (b);

(d) designate as current condition the next less important query condition in the list of query conditions;

(e) find the retrieval objects responding positively to current query condition in the set of retrieval objects;

(f) reduce the set of retrieval objects to only those that are found in step (f) if some retrieval objects are found in step (e);

(g) repeat steps (d), (e) and (f) until all query conditions of the list of query conditions have been designated once as current query condition.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. A method for automatically retrieving information from a database through a computer in communication with the database, the database having a plurality of retrieval objects, the computer defining a plurality of pre-ordered and distinct query conditions, wherein each query condition is ordered in a query condition list from the most important query condition to the least important query condition and wherein the most important query condition of the query condition list is initially designated as the current query condition, comprising the steps of:

a) testing the current query condition within the database to determine the number of database retrieval objects which satisfy the current query condition;

b) marking said current query condition if at least one database retrieval object satisfies the current query condition and designating the next pre-ordered and distinct query condition in the query condition list as the current query condition;

c) successively repeating steps a) and b) with each pre-ordered and distinct query condition of the query condition list in conjunction with all previously marked query conditions until a predetermined termination condition is satisfied.

2. A method as in claim 1 wherein after said predetermined termination condition is satisfied, step c) further comprises i) reporting the number of database retrieval objects which satisfy the query condition for each query condition; and, ii) identifying said retrieval objects to the computer.

3. The method as in claim 2 wherein the pre-determined termination condition requires that all query conditions have been the current query condition or that a pre-set minimum number of database retrieval objects which satisfy the query condition is determined.

4. The method as in claim 3 wherein the database system is a relational database system.

5. The method as in claim 4 wherein the query condition is a structured query language (SQL) statement.

6. The method as in claim 3 wherein the database system is a full text database system and the retrieval objects are documents.

7. The method as in claim 6 wherein the query condition is a word or word group and the testing of step a) is satisfied if a database document includes said word or word group.

8. The method as in claim 7 wherein the computer is remote to the database and is connected to the database prior to the initiation of step a) and disconnected from the database after said termination condition is achieved.

9. The method as in claim 1 wherein the pre-determined termination condition requires that all query conditions have been the current query condition.

10. The method as in claim 1 wherein the pre-determined termination condition requires that all query conditions have been the current query condition or a pre-set minimum number of database retrieval objects found in step a) is determined.

11. The method as in claim 1 wherein step c) is continued while a pre-set maximum number is less than the number of database retrieval objects found in step a).

12. The method as in claim 1 wherein the database system is a relational database system.

13. The method as in claim 1 wherein the query condition is structured query language (SQL) statement.

14. The method as in claim 1 wherein the database system is a full text database system and the retrieval objects are documents.

15. The method as in claim 1 wherein the query condition is a word or word group and the testing of step a) is satisfied if a database document includes said word or word group.

16. The method as in claim 1 wherein the computer is remote to the database and is connected to the database prior to the initiation of step a) and disconnected from the database after said termination condition is achieved.

17. A method for retrieving information from a database by an automatically relaxable query through a computer having a link with the database, the database having a plurality of retrieval objects, each retrieval object satisfying one or more query conditions, the automatically relaxable query being defined in the computer as a list of at least two query conditions ordered from the most important query condition to the least important query condition wherein each query condition of the list can be marked and starts as being unmarked and where the first query condition starts as being designated as the current query condition, comprising the steps of:

(a) testing the database for retrieval objects, with a query composed of the conjunction of all marked query conditions and the current query condition if at least one query condition of the list is marked, or with a query composed of the current query condition if there is no query condition marked in the list;

(b) marking the current query condition if retrieval objects are found in step (a);

(c) repeating steps (a) and (b) with the next query condition of the list designated as the current query condition until a predetermined termination condition is satisfied.

18. An automatic information retrieval system for use with a computer having a link to a database system containing a plurality of retrieval objects, each retrieval object satisfying one or more query conditions, a query inputting device for specifying a query expressed as a conjunction of query conditions, the information retrieval system comprising:

(a) means for inputting a list of at least two query conditions ordered from the most important query condition to the least important query condition wherein each query condition of the list can be marked and starts as being unmarked;

(b) means for designating as the current query condition the first query condition of said list of query conditions;

(c) means for querying said database system for retrieval objects, using said query inputting device, with a query composed of said current query condition;

(d) means for marking said current query condition if retrieval objects are found in (c);

(e) means for designating as current query condition the next query condition in said list of query conditions.

(f) means for querying said database system for retrieval objects, using said query inputting device, with a query composed of the conjunction of all previously marked query conditions and said current query condition;

(g) means for marking said current query condition if retrieval objects are found in (f);

(h) means for repeating (e), (f) and (g) until all query conditions of said list have been designated once as current query condition.

19. An automatic information retrieval method for use with a computer having a link to a database system containing a plurality of retrieval objects, each retrieval object satisfying one or more query conditions, a query inputting device for specifying a query expressed as a conjunction of query conditions, the information retrieval method comprising the steps of:

(a) inputting a list of at least two query conditions ordered from the most important query condition to the least important query condition wherein each query condition of the list can be marked and starts as being unmarked;

(b) designating as the current query condition the first query condition of said list of query conditions;

(c) querying said database system for retrieval objects, using said query inputting device, with a query composed of said current query condition;

(d) marking said current query condition if retrieval objects are found in step (c);

(e) designating as current query condition the next query condition in said list of query conditions;

(f) querying said database system for retrieval objects, using said query inputting device, with a query composed of the conjunction of all previously marked query conditions and said current query condition;

(g) marking said current query condition if retrieval objects are found in step (f);

(h) repeating steps (e), (f) and (g) until all query conditions of said list have been designated once as current query condition.

* * * * *